US007919013B2

(12) United States Patent  
Weber et al.

(10) Patent No.: US 7,919,013 B2
(45) Date of Patent: Apr. 5, 2011

(54) THERMOPLASTIC MOULDING COMPOSITIONS WITH HIGH STIFFNESS

(75) Inventors: Martin Weber, Maikammer (DE);
Xaver Hopfenspirger, Haβloch (DE);
Steffen Funkhauser, Viernheim (DE);
Walter Heckmann, Weinheim (DE);
Jörg Schnorr, Ludwigshafen (DE);
Raquel Fernandez Rodiles, Mannheim (DE); Rainer Klenz, Haβloch (DE);
Hagen Stawitzki, Karlsruhe (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/374,954

(22) PCT Filed: Jul. 17, 2007

(86) PCT No.: PCT/EP2007/057352
§ 371 (c)(1),
(2), (4) Date: Jan. 23, 2009

(87) PCT Pub. No.: WO2008/012233
PCT Pub. Date: Jan. 31, 2008

(65) Prior Publication Data
US 2010/0019210 A1  Jan. 28, 2010

(30) Foreign Application Priority Data

Jul. 26, 2006  (EP) .................................... 06117853

(51) Int. Cl.
*H01B 1/04* (2006.01)
(52) U.S. Cl. ......... 252/502; 252/500; 524/495; 524/607
(58) Field of Classification Search .................. 252/500, 252/502; 524/495, 607
See application file for complete search history.

(56) References Cited

U.S. PATENT DOCUMENTS

| 3,280,084 A | 10/1966 | Zelinski et al. |
| 3,637,554 A | 1/1972 | Childers |
| 3,639,508 A | 2/1972 | Kambour |
| 3,985,830 A | 10/1976 | Fetters et al. |
| 4,091,053 A | 5/1978 | Kitchen |
| 4,167,507 A | 9/1979 | Haaf |
| 4,537,949 A | 8/1985 | Schmidt et al. |
| 4,540,772 A | 9/1985 | Pipper et al. |
| 5,272,236 A | 12/1993 | Lai et al. |
| 6,844,061 B2 | 1/2005 | Morita et al. |
| 2006/0124906 A1* | 6/2006 | Bradley et al. ................. 252/500 |
| 2008/0249238 A1* | 10/2008 | Blondel et al. ................. 524/607 |
| 2008/0274355 A1* | 11/2008 | Hewel ............................. 428/402 |
| 2009/0098325 A1* | 4/2009 | Uchida et al. ............... 428/36.91 |

FOREIGN PATENT DOCUMENTS

| CA | 963594 A1 | 2/1975 |
| CA | 1120177 A1 | 3/1982 |
| DE | 2000118 A1 | 7/1970 |
| DE | 1932234 A1 | 9/1970 |
| DE | 2255930 A1 | 5/1973 |
| DE | 2434848 A1 | 2/1975 |
| DE | 2750515 A1 | 6/1978 |
| DE | 3038551 A1 | 4/1981 |
| DE | 10149152 A1 | 4/2003 |
| EP | 0080666 A1 | 6/1983 |
| EP | 129195 A2 | 12/1984 |
| EP | 129196 A2 | 12/1984 |
| EP | 205556 A1 | 12/1986 |
| EP | 270666 A1 | 6/1988 |
| EP | 0299444 | * 7/1988 |
| EP | 299444 A2 | 1/1989 |
| EP | 969128 A2 | 1/2000 |
| FR | 2847902 A1 | 6/2004 |
| WO | WO-8301254 A1 | 4/1983 |
| WO | WO-2004056919 A1 | 7/2004 |
| WO | WO-2004083303 A1 | 9/2004 |

OTHER PUBLICATIONS

Machine Translation of EP0299444.*

* cited by examiner

*Primary Examiner* — Harold Y Pyon
*Assistant Examiner* — Haidung D Nguyen
(74) *Attorney, Agent, or Firm* — Connolly Bove Lodge & Hutz LLP

(57) ABSTRACT

Thermoplastic molding compositions comprising
A) from 40 to 96.2% by weight of a semiaromatic polyamide,
B) from 2 to 30% by weight of an impact-modifying polymer which comprises functional groups,
C) from 1 to 50% by weight of fibrous or particulate fillers or a mixture of these,
D) from 0.2 to 5% by weight of a lubricant,
E) from 0.5 to 15% by weight of an electrically conductive additive,
F) from 0 to 30% by weight of other added materials,
where the total of the percentages by weight of components A) to F) is 100%.

3 Claims, No Drawings

THERMOPLASTIC MOULDING COMPOSITIONS WITH HIGH STIFFNESS

CROSS REFERENCE TO RELATED APPLICATIONS

This application is a National Stage of PCT/EP2007/057352 filed Jul. 17, 2007 which in turn claims priority from European Application 06117853.9 filed Jul. 26, 2006, the entire contents of which are incorporated herein by reference.

The present invention relates to thermoplastic molding compositions comprising
A) from 40 to 96.2% by weight of a semiaromatic polyamide,
B) from 2 to 30% by weight of an impact-modifying polymer which comprises functional groups,
C) from 1 to 50% by weight of fibrous or particulate fillers or a mixture of these,
D) from 0.2 to 5% by weight of a lubricant,
E) from 0.5 to 15% by weight of an electrically conductive additive,
F) from 0 to 30% by weight of other added materials,
where the total of the percentages by weight of components A) to F) is 100%.

The present invention moreover relates to the use of these molding compositions for production of moldings of any type and to the resultant moldings, preferably motor vehicle bodywork parts of any type.

Polymer blends based on polyamides and on polyphenylene ethers have high heat resistance and are therefore used as material for bodywork parts. Such products are marketed by GEP as Noryl®GTX, for example. A disadvantage for the use as bodywork material is the comparatively high decrease in stiffness under ambient conditions.

DE-A 101 49 152 describes thermoplastic molding compositions based on polyamides, on graft rubbers of ABS type, and on fine-particle fillers, as material for bodywork parts. Such products are marketed by Bayer with the trade mark Triax®, for example. While the stiffness of these products is higher than that of Noryl®GTX, the toughness of this material is insufficient in most cases.

WO 2004/056919 discloses conductive thermoplastic molding compositions which comprise mixtures of various conductivity additions.

A disadvantage of the known molding compositions is that because of high polyamide content they absorb moisture, the result being an enormous decrease in stiffness of such products.

It was therefore an object of the present invention to provide thermoplastic molding compositions which when compared with the prior art exhibit higher heat resistance, better toughness, and less decrease in stiffness on absorption of moisture.

The molding compositions defined in the introduction achieve this object. Preferred embodiments are given in the subclaims.

The inventive molding compositions comprise, as component A), from 40 to 96.2% by weight, preferably from 45 to 93.75% by weight, and in particular from 45 to 91.2% by weight, of at least one semiaromatic polyamide.

Examples of preferred semiaromatic copolyamides are PA 6/6T and PA 66/6T, the triamine content of these being less than 0.5% by weight, preferably less than 0.3% by weight (see EP-A 299 444).

The processes described in EP-A 129 195 and 129 196 can be used for preparation of the preferred semiaromatic copolyamides having low triamine content.

The inventive thermoplastic molding compositions comprise, as component A), at least one semiaromatic copolyamide with the structure described below:

The semiaromatic copolyamides A) comprise, as component $a_1$), from 40 to 90% by weight of units which derive from terephthalic acid and from hexamethylenediamine. A small proportion of the terephthalic acid, preferably not more than 10% by weight of the entire amount of aromatic dicarboxylic acids used, can be replaced by isophthalic acids or by other aromatic dicarboxylic acids, preferably those in which the carboxy groups are in para-position.

The semiaromatic copolyamides comprise, alongside the units which derive from terephthalic acid and from hexamethylenediamine, units ($a_2$) which derive from ε-caprolactam and/or units ($a_3$) which derive from adipic acid and from hexamethylenediamine.

The proportion of units which derive from ε-caprolactam is at most 50% by weight, preferably from 20 to 50% by weight, in particular from 25 to 40% by weight, while the proportion of units which derive from adipic acid and hexamethylenediamine is up to 60% by weight, preferably from 30 to 60% by weight, and in particular from 35 to 55% by weight.

The copolyamides can also comprise not only units of ε-caprolactam but also units of adipic acid and hexamethylenediamine; in this case, care has to be taken that the proportion of units free from aromatic groups is at least 10% by weight, preferably at least 20% by weight. The ratio of the units which derive from ε-caprolactam and from adipic acid and hexamethylenediamine is not subject to any particular restriction here.

Polyamides that have proven particularly advantageous for many applications have from 50 to 80% by weight, in particular from 60 to 75% by weight, of units which derive from terephthalic acid and hexamethylenediamine (units $a_1$)), and from 20 to 50% by weight, preferably from 25 to 40% by weight, of units which derive from ε-caprolactam (units $a_2$)).

The inventive semiaromatic copolyamides can also comprise, alongside the units $a_1$) to $a_3$) described above, subordinate amounts, preferably not more than 15% by weight, in particular not more than 10% by weight, of other polyamide units ($a_4$), and these being known from other polyamides. These units can derive from dicarboxylic acids having from 4 to 16 carbon atoms and from aliphatic or cycloaliphatic diamines having from 4 to 16 carbon atoms, or else from aminocarboxylic acid and, respectively, corresponding lactams having from 7 to 12 carbon atoms. Just a few examples may be mentioned here of suitable monomers of these types: suberic acid, azelaic acid, sebacic acid, or isophthalic acid as representatives of the dicarboxylic acids, and 1,4-butanediamine, 1,5-pentanediamine, piperazine, 4,4'-diaminodicyclohexylmethane, 2,2-(4,4'-diaminodicyclohexyl)propane, or 3,3'-dimethyl-4,4'-diaminodicyclohexylmethane as representatives of the diamines, and caprylolactam, enantholactam, omega-aminoundecanoic acid and laurolactam as representatives of lactams and aminocarboxylic acids.

The melting points of the semiaromatic copolyamides A) are in the range from 260 to above 300° C., and this high melting point is also associated with a high glass transition temperature which is generally more than 75° C., in particular more than 85° C.

Binary copolyamides based on terephthalic acid, hexamethylenediamine, and ε-caprolactam, having contents of about 70% by weight of units which derive from terephthalic acid and hexamethylenediamine having melting points in the region of 300° C. and a glass transition temperature of more than 110° C.

Binary copolyamides based of terephthalic acid, adipic acid, and hexamethylenediamine (HMD) achieve melting points of 300° C. and more even with relatively low contents of about 55% by weight of units composed of terephthalic acid and hexamethylenediamine, but the glass transition temperature here is not quite as high as with binary copolyamides which comprise ε-caprolactam instead of adipic acid or adipic acid/HMD.

The semiaromatic copolyamides A) can by way of example be prepared by the processes described in EP-A 129 195 and EP-A 129 196, and also EP-A 299 444.

The viscosity number is generally from 100 to 300 ml/g, preferably from 110 to 250 ml/g, to ISO 307, measured on a 0.5% strength solution (0.5 g/100 ml) in 96% by weight $H_2SO_4$ at 23° C.

It is also possible to use mixtures of above polyamides.

The inventive molding compositions comprise, as component B), from 2 to 30% by weight, preferably from 3 to 25% by weight, and in particular from 4 to 20% by weight, of an impact-modifying polymer (also termed rubber or elastomer).

Rubbers which increase the toughness of the polyamides generally have two substantial features: they comprise an elastomeric fraction whose glass transition temperature is below −10° C., preferably below −30° C., and they comprise at least one functional group which can interact with the polyamide. Examples of suitable functional groups are carboxylic acid groups, carboxylic anhydride groups, carboxylic ester groups, carboxamide groups, carboximide groups, amino groups, hydroxy groups, epoxy groups, urethane groups, and oxazoline groups.

The content of the functional groups is from 0.1 to 5, preferably from 0.2 to 4, and in particular from 0.3 to 3.5, % by weight, based on 100% by weight of B).

Preferred α-olefin-based rubbers are those composed of the following components:

$B_1$) from 40 to 100% by weight of at least one α-olefin having from 2 to 8 carbon atoms, $B_2$) from 0 to 90% by weight of a diene, $B_3$) from 0 to 45% by weight of a $C_1$-$C_{12}$-alkyl ester of acrylic acid or methacrylic acid, or a mixture of these esters, $B_4$) from 0 to 40% by weight of an ethylenically unsaturated mono- or dicarboxylic acid, or of a functional derivative thereof, $B_5$) from 0 to 40% by weight of a monomer comprising epoxy groups, $B_6$) from 0 to 5% by weight of other monomers capable of free-radical polymerization, with the proviso that component (B) is not an olefin homopolymer, because these, e.g. polyethylene, will not achieve the advantageous effects to the same extent.

A first preferred group is that of what are known as ethylene-propylene (EPM) rubbers or ethylene-propylene-diene (EPDM) rubbers, their ratio of ethylene units to propylene units preferably being in the range from 40:60 to 90:10.

The Mooney viscosities (ML1+4/100° C.) (measured with the large rotor after a running time of 4 minutes at 100° C., according to DIN 53 523) of such, preferably not crosslinked, EPM or EPDM rubbers (gel contents generally below 1% by weight) are preferably in the range from 25 to 100, in particular from 35 to 90.

EPM rubbers generally have practically no remaining double bonds, whereas EPDM rubbers may have from 1 to 20 double bonds per 100 carbon atoms.

Examples of diene monomers $B_2$) for EPDM rubbers are conjugated dienes, such as isoprene and butadiene, non-conjugated dienes with from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene, 2-isopropenyl-5-norbornene, and tricyclodienes, such as 3-methyltricyclo[5.2.1.0$^{2,6}$]-3,8-decadiene or mixtures of these. Preference is given to 1,5-hexadiene, 5-ethylidenenorbornene and dicyclopentadiene. The diene content of the EPDM rubbers is preferably from 0.5 to 50% by weight, in particular from 2 to 20% by weight and particularly preferably from 3 to 15% by weight, based on the total weight of the olefin polymer.

EPM or EPDM rubbers are preferably grafted with reactive carboxylic acids or derivatives of these. Particular mention may be made here of acrylic acid, methacrylic acid and derivatives of these, and also maleic anhydride.

Another group of preferred olefin polymers is that of copolymers of α-olefins having from 2 to 8 carbon atoms, in particular of ethylene, with $C_1$-$C_{18}$-alkyl esters of acrylic acid and/or methacrylic acid.

In principle, any of the primary, secondary, or tertiary $C_1$-$C_{18}$-alkyl esters of acrylic acid or methacrylic acid is suitable, but preference is given to esters having from 1 to 12 carbon atoms, in particular having from 2 to 10 carbon atoms.

Examples of these are methyl, ethyl, propyl, n-butyl, isobutyl, tert-butyl, 2-ethylhexyl, octyl, and decyl acrylates and the corresponding esters of methacrylic acid. Among these, particular preference is given to n-butyl acrylate and 2-ethylhexyl acrylate.

The proportion of the methacrylic esters and acrylic esters $B_3$) in the olefin polymers is from 0 to 45, preferably from 20 to 40, and in particular from 30 to 40, % by weight.

The olefin polymers may also comprise, instead of the esters $B_3$), or in addition to these, monomers $B_4$) having acid functionality and/or having latent acid functionality, these being derived from ethylenically unsaturated mono- or dicarboxylic acids, or monomers $B_5$) comprising epoxy groups.

Examples which may be mentioned of monomers $B_4$) are acrylic acid, methacrylic acid, tertiary alkyl esters of these acids, in particular tert-butyl acrylate, and dicarboxylic acids, such as maleic acid and fumaric acid, or derivatives of these acids, or else their monoesters.

Monomers having latent acid functionality are compounds which form free acid groups under the conditions of the polymerization process, or during incorporation of the olefin polymers into the molding compositions. Examples which may be mentioned of these are anhydrides of dicarboxylic acids having up to 20 carbon atoms, in particular maleic anhydride, and tertiary $C_1$-$C_{12}$-alkyl esters of the abovementioned acids, in particular tert-butyl acrylate and tert-butyl methacrylate.

The monomers having acid functionality or having latent acid functionality, and the monomers comprising epoxy groups, are preferably incorporated into the olefin polymers via addition of compounds of the general formulae I-IV to the monomer mixture.

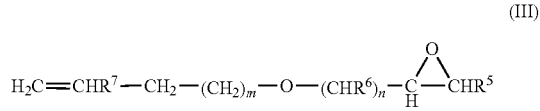

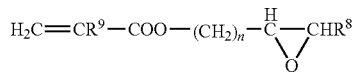

(IV)

where the radicals $R^1$-$R^9$ are hydrogen or alkyl groups having from 1 to 6 carbon atoms, and m is a whole number from 0 to 20, and n is a whole number from 0 to 10.

$R^1$-$R^7$ are preferably hydrogen, m is preferably 0 or 1, and n is preferably 1. The corresponding compounds are maleic acid, fumaric acid, maleic anhydride, $B_4$), or alkenyl glycidyl ether or vinyl glycidyl ether $B_5$).

Preferred compounds of the formulae I, II, III, and IV are maleic acid and maleic anhydride as component $B_4$) and epoxy-comprising esters of acrylic acid and/or methacrylic acid, particular preference being given to glycidyl acrylate and glycidyl methacrylate (as component $B_5$).

The proportion of each of the components $B_4$) and $B_5$) is from 0.07 to 40% by weight, in particular from 0.1 to 20% by weight, and particularly preferably from 0.15 to 15% by weight, based on the total weight of the olefin polymers.

Particular preference is given to olefin polymers composed of from 50 to 98.9% by weight, in particular from 55 to 65% by weight, of ethylene, from 0.1 to 20% by weight, in particular from 0.15 to 10% by weight, of glycidyl acrylate and/or glycidyl methacrylate, acrylic acid, and/or maleic anhydride, from 1 to 45% by weight, in particular from 5 to 40% by weight, of n-butyl acrylate and/or 2-ethylhexyl acrylate, and from 0 to 10% by weight, in particular from 0.1 to 3% by weight, of maleic anhydride or fumaric acid, or a mixture of these.

Other preferred esters of acrylic and/or methacrylic acid are the methyl, ethyl, propyl, isobutyl, and tert-butyl esters.

Examples of other monomers $B_6$) which may be used are vinyl esters and vinyl ethers.

The ethylene copolymers described above may be prepared by processes known per se, preferably via random copolymerization at high pressure and at elevated temperature.

The melt index of the ethylene copolymers is generally in the range from 1 to 80 g/10 min (measured at 190° C. and 2.16 kg load).

Other rubbers which may be used are commercial ethylene-α-olefin copolymers which comprise groups capable of reaction with polyamide. The underlying ethylene-α-olefin copolymers are prepared via transition metal catalysis in the gas phase or in solution. The following α-olefins may be used as comonomers: propylene, 1-butene, 1-pentene, 4-methyl-1-pentene, 1-hexene, 1-heptene, 1-octene, 1-nonene, 1-decene, 1-undecene, 1-dodecene, styrene and substituted styrenes, vinyl esters, vinyl acetates, acrylic esters, methacrylic esters, glycidyl acrylates, glycidyl methacrylates, hydroxyethyl acrylates, acrylamides, acrylonitrile, allylamine; dienes, e.g. butadiene, isoprene.

Particularly preferred components B) are ethylene-1-octene copolymers, ethylene-1-butene copolymers, ethylene-propylene copolymers, particular preference being given to constitutions composed of $B_{11}$) from 25 to 85% by weight, preferably from 35 to 80% by weight of ethylene, $B_{12}$) from 14.9 to 72% by weight, preferably from 19.8 to 63% by weight of 1-octene or 1-butene or propylene or a mixture of these, $B_4$) from 0.1 to 3% by weight, preferably from 0.2 to 2% by weight of an ethylenically unsaturated mono- or dicarboxylic acid, or of a functional derivative thereof.

The molar mass of these ethylene-α-olefin copolymers is from 10 000 to 500 000 g/mol, preferably from 15 000 to 400 000 g/mol (Mn, determined by means of GPC in 1,2,4-trichlorobenzene using PS calibration).

The ethylene content in the ethylene-α-olefin copolymers is from 5 to 97, preferably from 10 to 95, in particular from 15 to 93, % by weight.

One particular embodiment uses ethylene-α-olefin copolymers prepared by means of what is known as "single site catalysts". Further details can be found in U.S. Pat. No. 5,272,236. In this case, the ethylene-α-olefin copolymers have a molecular weight distribution which for polyolefins is narrow: smaller than 4, preferably smaller than 3.5.

Another starting material which can be used for functionalized rubbers is hydrogenated or partially hydrogenated styrene-diene block copolymers.

The degree of hydrogenation is from 50 to 95%, preferably from 60 to 100% (and can be determined by means of $^1$H NMR)

Preferred impact modifiers B are block polymers composed of vinylaromatics and of dienes. Impact modifiers of this type are known. DE-B 1 932 234, DE-B 2 000 118, and DE-A 2 255 930 describe elastomeric block copolymers comprising diene blocks and comprising vinylaromatic blocks, of various structures. DE-A 2 750 515, DE-A 2 434 848, DE-A 3 038 551, EP-A-0 080 666, and WO 83/01254 describe by way of example the use of appropriate hydrogenated block copolymers, if appropriate mixed with the non-hydrogenated precursor, as impact modifiers. The disclosure of the above publications is expressly incorporated herein by way of reference.

According to the invention, it is in particular possible to use vinylaromatic-diene block copolymers composed of blocks which comprise a hard phase (block type S) and, as soft phase, a block B/S which has random structure and is composed of diene units and of vinylaromatic units. The structure here may be homogeneous or inhomogeneous on statistical average along the chain.

An elastomeric block copolymer of this type, suitable according to the invention, is obtained by forming the soft phase from a random copolymer of a vinylaromatic with a diene; random copolymers of vinylaromatics and dienes are obtained via polymerization in the presence of a polar cosolvent.

A block copolymer that can be used according to the invention can be represented by way of example via one of the following general formulae (1)-(11):

$$(S-B/S)_n;$$ (1)

$$(S-B/S)_n-S;$$ (2)

$$B/S-(S-B/S)_n;$$ (3)

$$X-[(S-B/S)_n]_m^{+1}$$ (4)

$$X-[(B/S-S)_n]_m^{+1};$$ (5)

$$X-[(S-B/S)_n-S]_m^{+1};$$ (6)

$$X-[(B/S-S)_n-B/S]_m^{+1};$$ (7)

$$Y-[(S-B/S)_n]_m^{+1};$$ (8)

$$Y-[(B/S-S)_n]_m^{+1};$$ (9)

$$Y–[(S–B/S)_n–S]_m^{+1}; \tag{10}$$

$$Y–[(B/S–S)_n–B/S]_m^{+1}; \tag{11}$$

where
S is a vinylaromatic block,
B/S is the soft phase of a block randomly built up from diene units and vinylaromatic units,
X is the radical of an n-functional initiator,
Y is the radical of an m-functional coupling agent, and
m and n are natural numbers from 1 to 10.

Preference is given to a block copolymer of the general formula S–B/S–S, X–[–B/S–S]$_2$ and Y–[–B/S–S]$_2$ (where the abbreviations are as defined above), and particular preference is given to a block copolymer whose soft phase has been subdivided into blocks $$(B/S)_1–(B/S)_2; \tag{12}$$

$$(B/S)_1–(B/S)_2–(B/S)_1; \tag{13}$$

$$(B/S)_1–(B/S)_2–(B/S)_3; \tag{14}$$

where 1, 2 and 3 indicate different structures in the sense that the vinylaromatic/diene ratio in the individual B/S blocks is different, or it changes continuously within a block within the limits $(B/S)_1(B/S)_2$, where the glass transition temperature $T_g$ of each subblock is below 25° C.

Preference is also given to a block copolymer which has, in each molecule, more than one B/S and/or S block of different molar mass.

It is also possible for a B block to replace an S block built up exclusively from vinylaromatic units, since the only criterion is that an elastomeric block copolymer is formed. Copolymers of this type may, for example, have one of the structures (15) to (18)

$$B–(B/S) \tag{15}$$

$$(B/S)–B–(B/S) \tag{16}$$

$$(B/S)_1–B–(B/S)_2 \tag{17}$$

$$B–(B/S)_1–(B/S)_2. \tag{18}$$

Preferred vinylaromatics are styrene, o-methylstyrene, vinyltoluene or mixtures of these compounds. Preferred dienes are butadiene, isoprene, piperylene, 1-phenylbutadiene or mixtures of these compounds. A particularly preferred monomer combination is butadiene and styrene.

The soft blocks are particularly preferably composed of from about 25 to 75% by weight of styrene and from about 25 to 75% by weight of butadiene. Particular preference is given to soft blocks which comprise butadiene content of from about 34 to 69% by weight and styrene content of from about 31 to 66% by weight.

The proportion by weight of the diene in the entire block copolymer is from 15 to 65% by weight in the case of the monomer combination styrene/butadiene, and that of the vinylaromatic component is correspondingly from 85 to 35% by weight. Particular preference is given to butadiene-styrene block copolymers whose monomer makeup is from 25 to 60% by weight of diene and from 75 to 40% by weight of vinylaromatic compound.

The block copolymers are obtainable by anionic polymerization in a nonpolar solvent with addition of a polar cosolvent. The assumption here is that the cosolvent acts as a Lewis base in relation to the metal cation. Preferred solvents are aliphatic hydrocarbons, such as cyclohexane or methylcyclohexane. Preferred Lewis bases are polar aprotic compounds, such as ethers and tertiary amines. Examples of particularly effective ethers are tetrahydrofuran and aliphatic polyethers, such as diethylene glycol dimethyl ether. Tertiary amines which should be mentioned are tributylamine and pyridine. A small amount of the polar cosolvent, e.g. from 0.5 to 5% by volume, is added to the nonpolar solvent. Particular preference is given to amounts of from 0.1 to 0.3% by volume of tetrahydrofuran. Experience has shown that in most cases an amount of about 0.2% by volume is sufficient.

The structure of the Lewis base and the amount thereof which is added determine the copolymerization parameters and the proportion of 1,2 and 1,4 linkages, respectively, in the diene units. Examples of the inventive polymers have a proportion of from 15 to 40% of 1,2 linkages and from 85 to 60% of 1,4 linkages, based on all of the diene units.

The anionic polymerization is initiated using organometallic compounds. Preference is given to alkali metal compounds, particularly of lithium. Examples of initiators are methyllithium, ethyllithium, propyllithium, n-butyllithium, sec-butyllithium and tert-butyllithium. The organometallic compound is added as a solution in an inert hydrocarbon. The amount added depends on the desired molecular weight of the polymer, but is generally in the range from 0.002 to 5 mol %, based on the monomers.

The polymerization temperature may be from about 0 to 130° C., preferably from 30 to 100° C.

The proportion by volume of the soft phase in the solid has decisive importance for mechanical properties. According to the invention, the proportion by volume of the soft phase built up from diene sequences and from vinylaromatic sequences is from 60 to 95% by volume, preferably from 70 to 90% by volume and particularly preferably from 80 to 90% by volume. The A blocks produced from the vinylaromatic monomers form the hard phase, the proportion by volume of which is correspondingly from 1 to 40% by volume, preferably from 10 to 30% by volume and particularly preferably from 10 to 20% by volume.

It should be pointed out that there is no precise agreement between the abovementioned quantitative proportions of vinylaromatic compound and diene, the threshold values stated above for the phase volumes, and the composition implied by the inventive ranges of glass transition temperature, since in each case the values have been rounded to the nearest whole number. Where this is the case, it would be coincidental.

The proportion by volume of the two phases can be measured using phase-contrast electron microscopy or solid-state NMR spectroscopy. The proportion of the vinylaromatic blocks can be determined after osmium degradation of the polydiene content, by precipitation and weighing. The phase ratio which will be produced in a polymer can also be calculated from the amounts of monomers used if the polymerization is always allowed to proceed to completion.

For the purposes of the invention, the block copolymer is unambiguously defined by the quotient calculated using the percentage proportion by volume of the soft phase formed from the B/S blocks and the proportion of diene units in the soft phase, which is from 25 to 70% by weight for the combination styrene/butadiene.

The random incorporation of the vinylaromatic compounds into the soft block of the block copolymer and the use of Lewis bases during the polymerization affect the glass transition temperature ($T_g$). The glass transition temperature of the entire copolymer is preferably from −50° C. to +25° C., preferably below 0° C.

The molar mass of the S block is preferably from 1000 to 200 000 g/mol, in particular from 3000 to 80 000 g/mol. S blocks within a molecule may have different molar masses.

The molar mass of the B/S block is usually from 2000 to 250 000 [g/mol], preferably from 5000 to 150 000 [g/mol].

Like the S block, the B/S block may assume different molecular weights within a molecule.

The coupling center X is formed by the reaction of the living anionic chain ends with an at least bifunctional coupling agent. Examples of compounds of this type can be found in the U.S. Pat. Nos. 3,985,830, 3,280,084, 3,637,554 and 4,091,053. Preference is given, for example, to using epoxidized glycerides, such as epoxidized linseed oil or soya oil. Divinylbenzene is also suitable. Specifically suitable for dimerization are dichlorodialkylsilanes, dialdehydes, such as terephthalaldehyde, and esters, such as ethyl formate or ethyl benzoate.

Preferred polymer structures are S–B/S–S, X–[–B/S–S]$_2$ and Y–[–B/S–S]$_2$, where the random B/S block may itself have been subdivided into B1/S1–B2/S2–B3/S3– . . . blocks. The random block preferably comprises from 2 to 15 random subblocks, particularly preferably from 3 to 10 subblocks. The division of the random B/S block into a very large number of Bn/Sn subblocks yields the decisive advantage that the B/S block overall behaves as a virtually perfect random polymer, even if there is a gradient in the makeup within a Bn/Sn subblock, as is difficult to avoid in anionic polymerization under industrial conditions. It is therefore possible to add less than the theoretical amount of Lewis base. This increases the proportion of 1,4 diene linkages, lowers the glass transition temperature $T_g$, and reduces the tendency of the polymer to crosslink. Some proportion of the subblocks may be given a high diene fraction. This has the effect that the polymer retains a residual impact strength, even below the glass transition temperature of the predominant B/S blocks, and does not become completely brittle.

All of the weight and volume information given above relates to the monomer combination butadiene/styrene. However, this information may readily be recalculated to apply to other monomers which are technically equivalent to styrene and butadiene.

The block copolymers may be worked up by protonating the carbanions with an alcohol, such as isopropanol, acidifying the reaction mixture, e.g. with a mixture of $CO_2$ and water, and removing the solvent. The block copolymers may comprise oxidation inhibitors and antiblocking agents.

It is also possible to use mixtures of the abovementioned impact modifiers.

On the basis of these starting materials, the functionalized products are preferably obtained via grafting with functional monomers. It is preferable to use acrylic acid, fumaric acid, citric acid, or maleic anhydride. The grafting may be carried out in solution or in the melt. Preference is given to modification in the melt with exposure to initiators (peroxides, azo compounds, C-radical generators).

Commercial products B whose use is preferred are Exxelor® VA 1801 or 1803, Kraton® G 1901 FX or Fusabond® N NM493 D from Exxon, Kraton, and DuPont.

It is, of course, also possible to use mixtures of the types of rubber listed above.

Fibrous or particulate fillers C) which may be mentioned are carbon fibers, glass fibers, glass beads, amorphous silica, calcium silicate, calcium metasilicate, magnesium carbonate, kaolin, chalk, powdered quartz, mica, barium sulfate, and feldspar, the amounts used of these being from 1 to 50% by weight, in particular from 2 to 40% by weight, preferably from 3 to 30% by weight.

Preferred fibrous fillers which may be mentioned are carbon fibers, aramid fibers, and potassium titanate fibers, particular preference being given to glass fibers in the form of E glass. These may be used in the form of rovings or chopped glass in the forms commercially available.

The fibrous fillers may have been surface-pretreated with a silane compound to improve compatibility with the thermoplastic.

Suitable silane compounds are those of the general formula

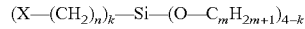

where the substituents are:
X NH$_2$—,

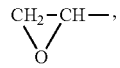

HO— n is a whole number from 2 to 10, preferably from 3 to 4
m is a whole number from 1 to 5, preferably from 1 to 2
k is a whole number from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used of the silane compounds for surface coating are from 0.01 to 2% by weight, preferably from 0.025 to 1.0% by weight, and in particular from 0.05 to 0.5% by weight (based on C).

Acicular mineral fillers are also suitable.

For the purposes of the invention, acicular mineral fillers are mineral fillers with very pronounced acicular character. An example which may be mentioned is acicular wollastonite. The L/D (length/diameter) ratio of the mineral is preferably from 8:1 to 35:1, with preference from 8:1 to 11:1. If appropriate, the mineral filler may have been pretreated with the abovementioned silane compounds; however, this pretreatment is not essential.

Other fillers which may be mentioned are kaolin, calcined kaolin, wollastonite, talc, and chalk, and also lamellar or acicular nanofillers, preferred amounts being from 0.1 to 10%. Those preferably used here are boehmite, bentonite, montmorillonite, vermiculite, hectorite, and laponite. The lamellar nanofillers are organically modified according to the prior art in order to obtain good compatibility of the lamellar nanofillers with the organic binder. Addition of the lamellar or acicular nanofillers to the inventive nano composites leads to a further rise in mechanical strength.

The inventive molding compositions preferably comprise talc as component C), this being a hydrated magnesium silicate whose constitution is $Mg_3[(OH)_2/Si_4O_{10}]$ or 3 MgO.4 $SiO_2.H_2O$. These "three-layer phyllosilicates" have triclinic, monoclinic, or rhombic crystal structure, with lamellar habit. Other trace elements which may be present are Mn, Ti, Cr, Ni, Na, and K, and the OH group may to some extent have been replaced by fluoride.

It is particularly preferable to use talc comprising 99.5% of particles whose sizes are <20 μm. The particle size distribution is usually determined via sedimentation analysis DIN 6616-1, and is preferably:
<20 μm 99.5% by weight
<10 μm 99% by weight
<5 μm 85% by weight
<3 μm 60% by weight
<2 μm 43% by weight Products of this type are commercially available as Micro-Talc I.T. extra (Omya).

The inventive molding compositions comprise, as component D), from 0.2 to 5% by weight, preferably from 0.25 to 4% by weight, and in particular from 0.3 to 3% by weight, of at least one lubricant. Preference is given to esters or amides of saturated or unsaturated aliphatic carboxylic acids having from 10 to 40, preferably 16 to 22, carbon atoms with saturated aliphatic alcohols or amines having from 2 to 40, preferably from 2 to 6, carbon atoms.

The carboxylic acids can be mono- or dibasic. Examples that may be mentioned are pelargonic acid, palmitic acid, lauric acid, margaric acid, dodecanedioic acid, behenic acid, and with particular preference stearic acid, and capric acid, and also montanic acid (a mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, pentaerythritol, and preference is given here to glycerol and pentaerythritol.

The aliphatic amines can be mono- to trifunctional. Examples here are stearylamine, ethylenediamine, propylenediamine, hexamethylenediamine, di(6-aminohexyl) amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use mixtures of various esters or amides or esters with amides, in combination, in any desired mixing ratio.

According to the invention, at least one electrically conductive additive is used as component E). It is preferable to use only one electrically conductive additive, but it is also possible, if appropriate, to use two or more electrically conductive additives. Examples of suitable electrically conductive additives are carbon nanotubes, graphite, or conductive carbon black. Carbon nanotubes are preferably used as component E) in the inventive molding compositions.

For the purposes of the present invention, carbon nanotubes are carbon-containing macromolecules in which the carbon (mainly) has graphite structure and the individual graphite layers have a tubular arrangement. Nanotubes and their synthesis have been previously disclosed in the literature (for example J. Hu et al., Acc. Chem. Res. 32 (1999), 435-445). For the purposes of the present invention, it is in principle possible to use any type of nanotubes.

The diameter of the individual tubular graphite layers (graphite tubes) is preferably from 4 to 12 nm, in particular from 5 to 10 nm. In principle, nanotubes can be divided into what are known as single walled nanotubes (SWNTs) and multiwalled nanotubes (MWNTs). The MWNTs therefore have a plurality of stacked graphite tubes.

The external form of the tubes can moreover vary, and this can have uniform diameter internally and externally, but it is also possible to produce tubes in the shape of a knot and to produce vermicular structures.

The aspect ratio (length of a particular graphite tube with respect to its diameter) is at least >10, preferably >5. The length of the nanotubes is at least 10 nm. For the purposes of the present invention, MWNTs are preferred as component E). In particular, the aspect ratio of the MWNTs is about 1000:1 and their average length is about 10 000 nm.

The BET specific surface area is generally from 50 to 2000 m$^2$/g, preferably from 200 to 1200 m$^2$/g. HRTEM shows that the amounts of impurities (e.g. metal oxides) produced during the catalytic preparation process are generally from 0.1 to 12%, preferably from 0.2 to 10%.

Suitable "multiwall" nanotubes can be purchased from Hyperion Catalysis Int., Cambridge Mass. (USA) (see also EP 205 556, EP 969 128, EP 270 666, U.S. Pat. No. 6,844, 061).

The conductive carbon black used can be any commonly used form of carbon black, an example of a suitable product being Ketjenblack 300 commercially available from Akzo.

Conductivity modification can also be achieved by using conductive carbon black. Carbon black conducts electrons (F. Camona, Ann. Chim. Fr. 13, 395 (1988)) by virtue of graphitic layers embedded in amorphous carbon. Electricity is conducted within the aggregates composed of carbon black particles and between the aggregates if the distances between the aggregates are sufficiently small. In order to achieve conductivity while minimizing the amount added, it is preferable to use carbon blacks having an anisotropic structure (G. Wehner, Advances in Plastics Technology, APT 2005, Paper 11, Katowice 2005). In such carbon blacks, the primary particles associate to give anisotropic structures, the result being that the necessary distances between the carbon black particles for achievement of conductivity are achieved in compounded materials even at comparatively low loading (C. Van Bellingen, N. Probst, E. Grivei, Advances in Plastics Technology, APT 2005, Paper 13, Katowice 2005).

By way of example, the oil absorption of suitable types of carbon black (measured to ASTM D2414-01) is at least 60 ml/100 g, preferably more than 90 ml/100 g. The BET surface area of suitable products is more than 50 m$^2$/g, preferably more than 60 m$^2$/g (measured to ASTM D3037-89). There can be various functional groups on the surface of the carbon black. The conductive carbon blacks can be prepared by various processes (G. Wehner, Advances in Plastics Technology, APT 2005, Paper 11, Katowice 2005).

It is also possible to use graphite as conductivity additive. Graphite is a form of carbon as described by way of example in A. F. Hollemann, E. Wieberg, N. Wieberg, "Lehrbuch der anorganischen Chemie" [Textbook of inorganic chemistry], 91$^{st}$-100$^{th}$ edn., pp. 701-702. Graphite is composed of planar carbon layers mutually superposed. Graphite can be comminuted by milling. The particle size is in the range from 0.01 μm to 1 mm, preferably in the range from 1 to 250 μm.

The proportion of component E) in the inventive molding compositions is from 0.5 to 15% by weight, preferably from 1 to 14% by weight, particularly preferably from 1.5 to 13% by weight, based on the total weight of the molding composition.

The inventive thermoplastic molding compositions can comprise, as component F), amounts of up to 30% by weight, preferably up to 25% by weight, of other added materials, such as stabilizers, oxidation retarders, agents to counter decomposition due to heat and decomposition due to ultraviolet light, lubricants and mold-release agents, colorants, such as dyes and pigments, nucleating agents, plasticizers, etc.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants which may be added are inorganic pigments, such as titanium dioxide, ultramarine blue, iron oxide, and carbon black, and also organic pigments, such as phthalocyanines, quinacridones and perylenes, and also dyes, such as nigrosine and anthraquinones.

Nucleating agents which may be used are sodium phenylphosphinate, alumina, silica, and preferably talc.

Preferred stabilizers are amounts of up to 2, preferably from 0.5 to 1.5, and in particular from 0.7 to 1, % by weight of aromatic secondary amines of the general formula I:

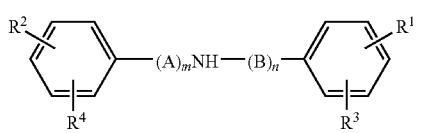

where
m and n=0 or 1,
A and B=$C_1$-$C_4$-alkyl- or phenyl-substituted tertiary C atom,
$R^1$ and $R^2$=hydrogen or a $C_1$-$C_6$-alkyl group in ortho or para position, which may, if appropriate, have substitution by from 1 to 3 phenyl radicals, halogen, carboxy group, or a transition metal salt of this carboxy group, and
$R^3$ and $R^4$=hydrogen or a methyl radical in ortho or para position, if m plus n is 1 or a tertiary $C_3$-$C_9$-alkyl group in ortho or para position, which may, if appropriate, have substitution by from 1 to 3 phenyl radicals, if m plus n is 0 r 1.

Preferred radicals A or B are symmetrically substituted tertiary carbon atoms, particular preference being given to dimethyl-substituted tertiary carbon. Preference is equally given to tertiary carbon atoms which have from 1 to 3 phenyl groups as substituents.

Preferred radicals $R^1$ or $R^2$ are para tert-butyl or tetramethyl-substituted n-butyl, where the methyl groups may preferably have been replaced by from 1 to 3 phenyl groups. Preferred halogens are chlorine and bromine. Examples of transition metals are those which can form transition metal salts with $R^1$ or $R^2$=carboxy.

Preferred radicals $R^3$ or $R^4$ are, for m plus n=2, hydrogen and, for m plus n=0 or 1, a tert-butyl radical in ortho or para position which in particular may have substitution by from 1 to 3 phenyl radicals.

Examples of secondary aromatic amines D) are
4,4'-bis(α,α'-tert-octyl)diphenylamine
4,4'-bis(α,α-dimethylbenzyl)diphenylamine
4,4'-bis(α-methylbenzhydryl)diphenylamine
4-(1,1,3,3-tetramethylbutyl)4'-triphenylmethyldiphenylamine
4,4'-bis(α,α-p-trimethylbenzyl)diphenylamine
2,4,4'-tris(α,α-dimethylbenzyl)diphenylamine
2,2'-dibromo-4,4'-bis(α,α-dimethylbenzyl)diphenylamine
4,4'-bis(α,α-dimethyl benzyl)-2-carboxydiphenylamini-nickel-4,4'-bis(α,α-dimethylbenzyl)diphenylamine
2-sec-butyl-4,4'-bis(α,α-dimethylbenzyl)diphenylamine
4,4'-bis(α,α-dimethyl benzyl)-2-(α-methylheptyl)diphenylamine
2-(α-methylpentyl)-4,4'-ditrityldiphenylamine
4-α,α-dimethylbenzyl-4'-isopropoxydiphenylamine
2-(α-methylheptyl)-4'-(α,α-dimethylbenzyl)diphenylamine
2-(α-methylpentyl)-4'-trityldiphenylamine
4,4'-bis(tert-butyl)diphenylamine, and:

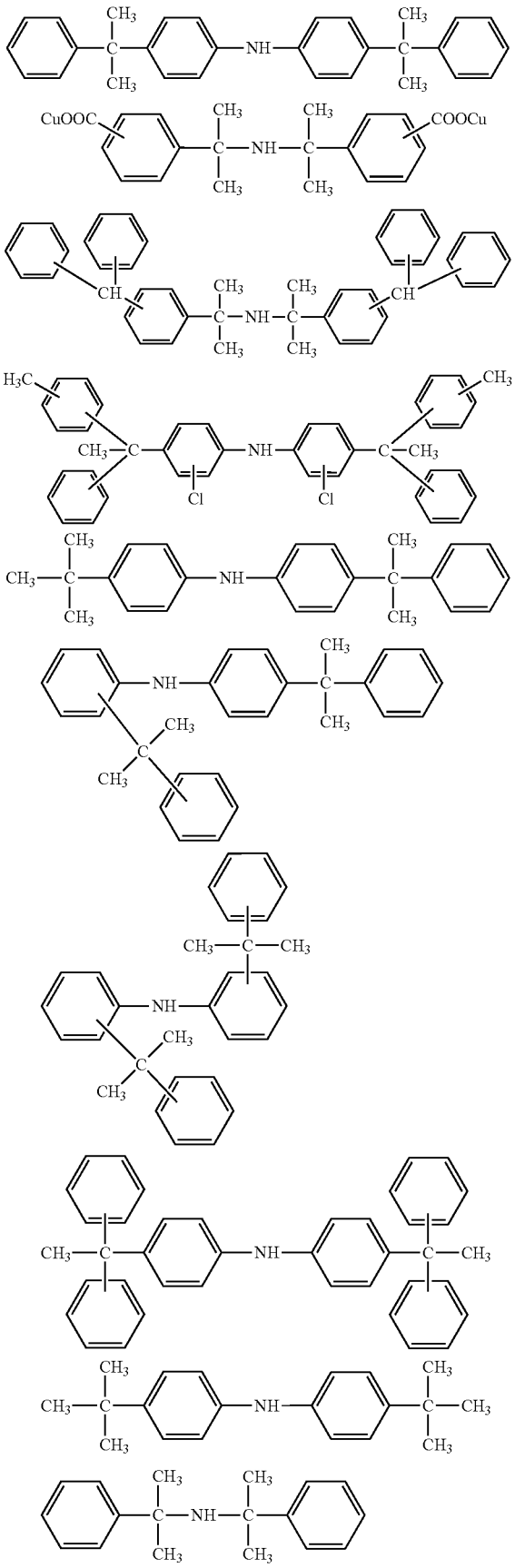

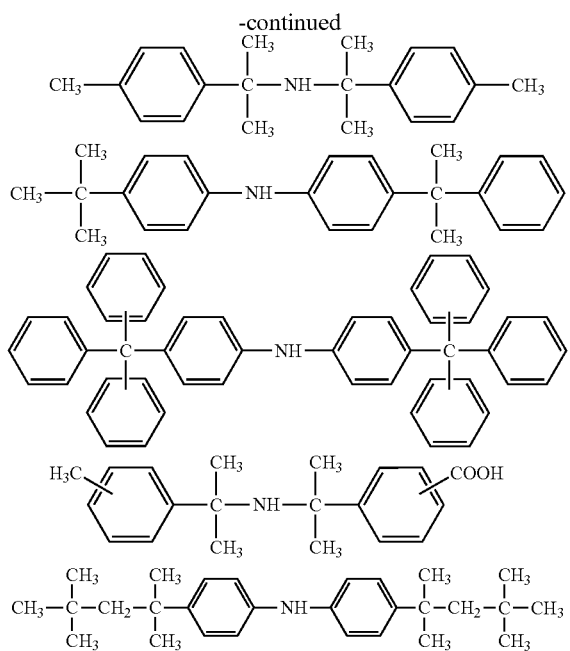

The process described in CA-A 9 63 594 are used for preparation. Preferred secondary aromatic amines are diphenylamine and its derivatives, which are commercially available as Naugard® (Uniroyal). These are preferred in combination with up to 2000, preferably from 100 to 2000, with preference from 200 to 500, and in particular from 200 to 400 ppm of at least one phosphorus-comprising inorganic acid or derivatives thereof.

Preferred acids are hypophosphorous acid, phosphorous acid, or phosphoric acid, and also salts thereof with alkali metals, particular preference being given to sodium and potassium. Particularly preferred mixtures are hypophosphorous acid and phosphorous acid or, respectively, alkali metal salts thereof in a ratio of from 3:1 to 1:3. Organic derivatives of these acids are preferably ester derivatives of abovementioned acids.

The inventive thermoplastic molding compositions may be prepared by methods known per se, by mixing the starting components in conventional mixing apparatus, such as screw extruders, Brabender mixers or Banbury mixers, and then extruding them. The extrudate may be cooled and comminuted. It is also possible to premix individual components and then to add the remaining starting materials individually and/ or likewise in a mixture. The mixing temperatures are generally from 230 to 320° C.

In a further preferred method of operation, the components B) to E) and, if appropriate, F) can be mixed with a prepolymer, compounded, and pelletized. The resultant pellets are then solid-phase-condensed, continuously or batchwise, under an inert gas, at a temperature below the melting point of component A) until the desired viscosity has been reached.

The inventive thermoplastic molding compositions feature good toughness and good fracture energy, together with good stiffness (small decrease on absorption of moisture), and also markedly improved heat resistance and low linear coefficient expansion.

These materials are suitable for production of fibers, of foils, and of moldings of any type. Some examples are as follows: cylinder head covers, motorcycle covers, inlet manifolds, charge-air cooler caps, plug connectors, gearwheels, cooling fan wheels, cooling water tanks.

Use in automotive interiors is for dashboards, steering column switches, seat components, headrests, center consoles, gearbox components and door modules, and use on automotive exteriors is for door handles, exterior mirror components, windshield wiper components, windshield wiper protective housings, grilles, roof rails, sunroof frames, engine covers, cylinder head covers, inlet manifolds, windshield wipers, and exterior bodywork parts, such as wheel surrounds, door cladding, tailgates, spoilers, side components, roof modules, and engine hoods.

EXAMPLES

Preparation and Testing of Molding Compositions

Heat resistance of the specimens was determined to ISO 306 (Vicat B) (load 50 N, temperature rise: 50 K per hour, on ISO specimens). Notched impact resistance of the products was determined to ISO 179 1eA.

Stiffness of the materials was characterized via the modulus of elasticity determined in the tensile test to ISO 527. In order to accelerate absorption of moisture, the test specimens were stored for 14 days at 70° C./70% r.h., and then stored for equilibration (24 h) before the tensile test was carried out.

Surface resistivity was measured to IEC 60093 under standard conditions (23° C./50% r.h.), using electrodes composed of conductive silver paint (length=50 mm/separation=5 mm) and a counter-electrode. Prior to the measurements, the specimens were stored for 7 days under standard conditions (23° C./50% r.h.).

Component A1

A semiaromatic nylon-6/6, T copolyamide (ratio 30:70) whose VN was 130 ml/g to ISO 307 was used as component A1.

Component Acomp.

Nylon-6,6, e.g. Ultramid® A3, characterized via a viscosity number of 150 ml/g (measured in 1% strength by weight sulfuric acid).

Component B1

Fusabond® N NM493D from DuPont, ethylene-octene copolymer functionalized with maleic anhydride, MFR 1.6 g/10' (D1238, 190° C./2.16 kg).

Component B2

Ethylene-propylene rubber modified with 0.7% by weight maleic acid/maleic anhydride, characterized via an MFI value of 3 g per 10 min (measured with 2.16 kg at 230° C.).

Component C

Talc, e.g. IT Extra from Omya. $X_{10}=1.7$ μm. $X_{90}=10.8$ μm (measured by means of laser scattering, the minerals having been homogenized in a suspension cell in a surfactant mixture of deionized water/1% of CV K8 (marketed by: CV-Chemievertrieb, Hanover) (magnetic stirrer, 60 rpm).

Component D1

Caesit® AV 40, Bärlocher: Ca stearate

Component D2

Pentaerythritol tetrastearate

Component E1

Ensaco 250 conductive carbon black from Timcal, characterized via a porosity of 170 kg/m³, determined to ASTM D1 539-99.

Component E2

Compounded material composed of 20% by weight of nanotubes from Hyperion Catalysis in component A1, characterized via an MVR of 170 ml/10', ISO 1133, at 300° C. with 21.6 kg (determined to ISO 1133).

Component E2Comp

Compounded material composed of 20% by weight of nanotubes from Hyperion Catalysis in component Acomp, characterized via an MVR of 38 ml/10' (ISO 1133, at 275° C. with 5 kg).

The following product was used for comparison:

compP1: PA/PPE blend, e.g. Noryl® GTX 974 from GEP Production of Products

The components were mixed at a melt temperature of from 300 to 320° C. in a twin-screw extruder. The melt was passed through a water bath and pelletized.

The test specimens were produced at a melt temperature of 330° C. (Noryl GTX 979 and comparative example based on Ultramid®A3: 295° C.) and at a mold temperature of 100° C.

Table 1 lists the results of the tests and the constitutions of the molding compositions.

TABLE 1

| | Molding composition | | | | |
|---|---|---|---|---|---|
| | comp 1 | 2 | 3 | 4 | comp 5 |
| A1 | 74 | 67.5 | 65.5 | 67.5 | — |
| Acomp | — | — | — | — | 67.5 |
| B1 | 16 | 14.5 | 14.5 | — | 14.5 |
| B2 | — | — | — | 14.5 | — |
| C | 8.7 | 8.7 | 8.7 | 8.7 | 8.7 |
| D1 | 0.5 | 0.5 | 0.5 | 0.5 | 0.5 |
| D2 | — | — | — | — | — |
| E1 | — | 8 | 10 | 8 | 8 |
| E2 | — | — | — | — | — |
| F1 | 0.78 | 0.78 | 0.78 | 0.78 | 0.78 |
| F2 | 0.02 | 0.02 | 0.02 | 0.02 | 0.02 |
| Vicat B [° C.] | 164 | 175 | 177 | 180 | 195 |
| MVI [ml/10'] | 32.0 | 13.0 | 6.7 | 10.2 | n.d. |
| ak, RT [kJ/m$^2$] | 13.1 | 10.9 | 9.9 | 9.2 | 8.2 |
| Modulus of elasticity, dry [MPa] | 2968 | 3227 | 3340 | 3400 | 3200 |
| Modulus of elasticity, wet [MPa] | 3010 | 3340 | 3390 | 3450 | 2480 |
| Surface resistivity [ohms] | >10$^{15}$ | 2 * 10$^{12}$ | 3 * 10$^{10}$ | 2 * 10$^{12}$ | 3 * 10$^{13}$ |

TABLE 2

| | Molding composition | | | | |
|---|---|---|---|---|---|
| | 6 | 7 | 8 | 9 | Noryl |
| A1 | 60 | 59.7 | 59.7 | — | |
| Acomp | — | — | — | 59.7 | |
| B1 | 16 | 16 | 16 | 16 | |
| B2 | — | — | — | — | |
| C | 8.7 | 8.7 | 8.7 | 8.7 | |
| D1 | 0.5 | 0.3 | — | 0.3 | |
| D2 | — | 0.5 | 0.8 | 0.5 | |
| E1 | 4 | 4 | 4 | 4 | |
| E2 | 10 | 10 | 10 | — | |
| E2comp | | | | 10 | |
| F1 | 0.78 | 0.78 | 0.78 | 0.78 | |
| F2 | 0.02 | 0.02 | 0.02 | 0.02 | |
| Vicat B [° C.] | 171 | 173 | 172 | 193 | 183 |
| MVI [ml/10'] | 11.5 | 17.2 | 16.5 | n.d. | n.d. |
| ak, RT [kJ/m$^2$] | 8.8 | 10.9 | 8.7 | 6.9 | 19 |
| Modulus of elasticity, dry [MPa] | 3240 | 3190 | 3160 | 3050 | 2175 |
| Modulus of elasticity, wet [MPa] | 3345 | 3270 | 3240 | 2380 | 1330 |
| Surface resistivity [ohms] | 4 * 10$^{10}$ | 7 * 10$^{9}$ | 2 * 10$^{10}$ | 3 * 10$^{12}$ | 1 * 10$^{13}$ |

The invention claimed is:

1. A thermoplastic molding composition comprising
   A) from 40 to 96.2% by weight of a semiaromatic polyamide,
   B) from 2 to 30% by weight of an impact-modifying polymer which comprises functional groups, wherein the component B) is a copolymer comprising:
      $B_1$) from 35 to 80% by weight of ethylene,
      $B_2$) from 19.8 to 63% by weight of 1-octene or 1-butene or propylene or a mixture thereof,
      $B_3$) from 0.2 to 2% by weight of an ethylenically unsaturated mono- or dicarboxylic acid or of a functional derivative of such an acid,
   C) from 1 to 50% by weight of fibrous or particulate fillers or a mixture thereof,
   D) from 0.2 to 5% by weight of a lubricant selected from the group consisting of esters or amides of saturated or unsaturated aliphatic carboxylic acids having from 10 to 40 carbon atoms with saturated aliphatic alcohols or amines having from 2 to 40 carbon atoms,
   E) from 0.5 to 15% by weight of an electrically conductive additive selected from the group consisting of carbon nanotubes, carbon black, graphite and a mixture thereof,
   F) from 0 to 30% by weight of other added materials selected from the group consisting of stabilizers, oxidation retarders, heat stabilizers, UV stabilizers, mold release agents, colorants, nucleating agents, plasticizers and mixtures thereof,
   where the total of the percentages by weight of components A) to F) is 100%.

2. A fiber, a foil, or a molding, obtained from the thermoplastic molding compositions according to claim 1.

3. A motor vehicle bodywork part, obtained from the thermoplastic molding compositions according to claim 1.

* * * * *